(12) United States Patent
Vidal Caupena et al.

(10) Patent No.: US 7,124,673 B2
(45) Date of Patent: Oct. 24, 2006

(54) HORIZONTAL CUTTER OF DOUBLE-BODIED BOTTLES ATTACHED TO EACH OTHER AT THE NECK

(75) Inventors: Jordi Vidal Caupena, Massanes (ES); Juan Mach Guirado, Massanes (ES)

(73) Assignee: Construcciones Mecanicas Maer, S.A., Massanes (ES)

( * ) Notice: Subject to any disclaimer, the term of this patent is extended or adjusted under 35 U.S.C. 154(b) by 0 days.

(21) Appl. No.: 10/533,803

(22) PCT Filed: Oct. 30, 2003

(86) PCT No.: PCT/IB03/04857

§ 371 (c)(1),
(2), (4) Date: May 4, 2005

(87) PCT Pub. No.: WO2004/045831

PCT Pub. Date: Jun. 3, 2004

(65) Prior Publication Data

US 2006/0011031 A1    Jan. 19, 2006

(30) Foreign Application Priority Data

Nov. 15, 2000    (ES) ............................... 200202760

(51) Int. Cl.
*B26D 7/00* (2006.01)
*B29C 49/74* (2006.01)

(52) U.S. Cl. ..................... 83/410.9; 83/411.1; 83/418; 83/566; 83/924; 425/527; 425/537; 264/161; 264/533; 264/536; 82/46; 82/101; 82/102; 156/584

(58) Field of Classification Search ................. 83/566, 83/410.9, 411.1, 924, 946, 914, 881, 879, 83/882, 411.5, 883, 171, 418, 495; 156/584, 156/446, 924, 946; 30/493, 495; 29/568.8, 29/566.1; 264/536, 564, 566, 533, 534, 296, 264/161, 159, 94; 425/305.1, 392, 394, 806, 425/403.1, 527, 537, 499, 497, 446, 291; 82/46–48, 101, 102, 52, 53
See application file for complete search history.

(56) References Cited

U.S. PATENT DOCUMENTS

| | | | | |
|---|---|---|---|---|
| 3,279,599 | A | * | 10/1966 | Drennan ...................... 209/531 |
| 3,432,586 | A | | 3/1969 | Stenger ........................ 264/94 |
| 3,448,648 | A | | 6/1969 | Magruder et al. ............ 83/566 |
| 3,499,068 | A | * | 3/1970 | Brown ......................... 264/68 |
| 3,800,638 | A | * | 4/1974 | Duikers et al. ............... 82/101 |
| 3,818,785 | A | * | 6/1974 | Wakabayashi ............... 82/101 |
| 3,862,698 | A | * | 1/1975 | Hafele ...................... 428/542.8 |
| 3,967,516 | A | * | 7/1976 | Griesing et al. ............... 82/47 |

(Continued)

*Primary Examiner*—Boyer D. Ashley
*Assistant Examiner*—Ghassem Alie
(74) *Attorney, Agent, or Firm*—Wolf Block Schorr & Solis-Cohen LLP

(57) ABSTRACT

A horizontal cutter of double-bodied bottles attached to each other at a neck which comprises means (2) for advancing the bottles (3) and a cutting device (1) of the neck of the bottles. The cutting device (1) comprises a pair of blades (7), a pair of rotating plates (4) for drawing the bottles (3) along and a plurality of drive pulleys (9) in contact with the bottles (3), in such a way that as the rotating plates (4) move so do the bottles, at the same time rotating about their axes and in contact with the blades. The horizontal cutter ensures fast and effective cutting of the bottles, while occupying little space.

5 Claims, 4 Drawing Sheets

U.S. PATENT DOCUMENTS

| | | | | |
|---|---|---|---|---|
| 4,025,381 A | * | 5/1977 | Amberg | 156/446 |
| 4,361,531 A | * | 11/1982 | Black | 264/161 |
| 4,938,636 A | * | 7/1990 | Aidlin et al. | 406/31 |
| 5,123,993 A | * | 6/1992 | Wiggins | 156/584 |
| 5,201,788 A | * | 4/1993 | Le Naour | 53/468 |
| 5,617,768 A | * | 4/1997 | Palazzolo | 82/47 |
| 6,199,615 B1 | * | 3/2001 | Klarl | 156/584 |
| 6,619,946 B1 | * | 9/2003 | Marshall et al. | 425/305.1 |
| 6,675,680 B1 | * | 1/2004 | Seitz et al. | 83/23 |
| 6,817,276 B1 | * | 11/2004 | Kowal | 83/881 |
| 2002/0117035 A1 | * | 8/2002 | Caupena | 83/401 |
| 2004/0011169 A1 | * | 1/2004 | Marshall et al. | 83/13 |
| 2005/0150340 A1 | * | 7/2005 | Terry et al. | 83/54 |
| 2006/0071361 A1 | * | 4/2006 | Fiorani et al. | 264/161 |

* cited by examiner

HORIZONTAL CUTTER OF DOUBLE-BODIED BOTTLES ATTACHED TO EACH OTHER AT THE NECK

This invention relates to a horizontal cutter of double-bodied bottles attached to each other at the neck.

BACKGROUND OF THE INVENTION

Known in the art are horizontal cutting machines whose purpose is to provide two new single bottles by separating the two bodies of a double-bodied bottle manufactured previously by means of blowing, extrusion or other shaping methods.

On such machines the bottles reach a cutting station in horizontal position by means of a conveyor belt with dividing segments and an end ramp. As the cut is made the bottles move along resting on a pair of tracks. A drive belt situated above the tracks makes contact with the upper part of the bottle, making it advance and rotate about its own axis. As the bottle advances a fixed blade located between the two tracks and gradually increasing their height performs the cut. Thanks to the bottle shifting and rotation movement the cut is made around the entire perimeter of the neck. When the cut is completed, the two bottles and the central attaching part are ejected.

These machines have the disadvantage that the rotation of the bottles becomes imprecise as their passing speed increases, since the rotation resistance caused by the cutting action of the blade disturbs the bottle's travel-path, in which the bottle has only one point of contact with the support tracks and another with the drive belt. Furthermore, in order to implement the cutting of the bottles there has to be a certain space between them, since the bottle has to be able to rotate freely as the cut is being made, with no means other than the tracks and the drive belt in contact with it. All these factors have an adverse effect on productivity, as the bottles often fall over or their path deviates at the cut is made. Moreover, the limited cutting speed and the space that has to be left between one bottle and the next also reduces the output of the system.

This system further requires the cut to be made in a straight line, so that the machine takes up a considerable amount of space.

U.S. Pat. No. 3,448,648 describes an apparatus for trimming hollow articles which includes means for clamping the articles in a predetermined orientation and a cylindrical knife assembly which passes over the clamped articles to sever a flange or the like on the articles.

In order to resolve these disadvantages a choice has sometimes been made in favour of heating the blade so that the plastic material of the bottles melts as the cut is being made. This achieves reduced friction between the blade and the bottle, and the cut can be made faster. After the cut, however, and due to the melting of the material carried out by the blade, the bottles have a burr at the mouth that subsequently has to be removed, which involves increased costs and extra manufacturing time.

DESCRIPTION OF THE INVENTION

The objective of this invention is to resolve the disadvantages of the devices known in the prior art, while further providing additional advantages that will become clear from the description that follows.

The machine for the cutting of double-bodied bottles attached to each other at the neck is of the type which comprises means for advancing the bottles and a bottle-neck cutting device, and is characterised in that said cutting device comprises means for rotating around their axis of symmetry a pair of parallel oriented rotary plates, a pair of arc shaped blades, which are oriented in parallel to the plane of said rotary plates and distanced in such a way that the double-bodied bottles can fit between the arc shaped blades and the rotary plates, a plurality of drive pulleys, which are parallel arranged to the axis of the rotating plates, and which in operation contact the neck of the bottles, whereby said rotary plates comprise a plurality of perimetral housings which are arranged in such a way that they can move the bottles, following a circular route, towards the arc shaped blades so that a cut is made around the entire outline of the neck of the bottles, and whereby said pair of pulleys are arranged in such a way to ensure that the bottles rotate about their own axes, an that the bottles are pressed against the arc shaped blades.

Thanks to these characteristics the bottles are made to move and to rotate about their own axes, this facilitating and speeding up the cutting operation.

Moreover, unlike other machines, the bottles follow a circular route and not a straight-line path at the time of the cut, which means that the space occupied by the cutting device is reduced substantially.

According to one embodiment of this invention, the profile of the drive pulleys and of the blade carriers is defined by being complementary to that of the necks of the bottles.

The bottles are thus guided by the blade carriers, rendering impossible any deviation or falling of the bottles that could cause a stoppage or fault in production, while also improving the precision of the cut.

The housings allow the bottles to be well-positioned throughout the cutting operation.

Advantageously, the cutting machine comprises a pressurised air conveyor for moving the bottles towards the housings of the plates by means of pressurized air that circulates inside the conveyor, characterized in that this conveyor comprises a guide provided with a first pair of rails situated in the lower part of the guide an a second pair of rails situated in the upper part of the guide, so that grooves present in the neck of the bottles are positioned between said lower and upper rails.

The feed of bottles is implemented effectively and speedily, for thanks to this system the bottles arrive at the device in a row, well-positioned and in contact with each other, thus optimising space and avoiding empty spaces or bottle-jams due to the deviation of any bottle.

In one embodiment, the housings are separated by spoon-shaped teeth in order to facilitate positioning of the bottles inside said housings.

This particular shape of the teeth facilitates bottle pick-up at and ejection of the bottles at the inlet and outlet of the cutting device.

In another embodiment, the machine comprises at the cutting device outlet section three ramps, two of which gather the two cut bottles while the third gathers the intermediate dome resulting from the cut.

Ejection and separation of the bottles is thus carried out quickly and effectively.

BRIEF DESCRIPTION OF THE DRAWINGS

In order to assist the description of all that has been outlined above some drawings are attached which show schematically and solely by way of non-restrictive example a practical case of embodiment of the cutting machine of the invention. In the drawings.

DESCRIPTION OF A PREFERRED EMBODIMENT

Figure 1:
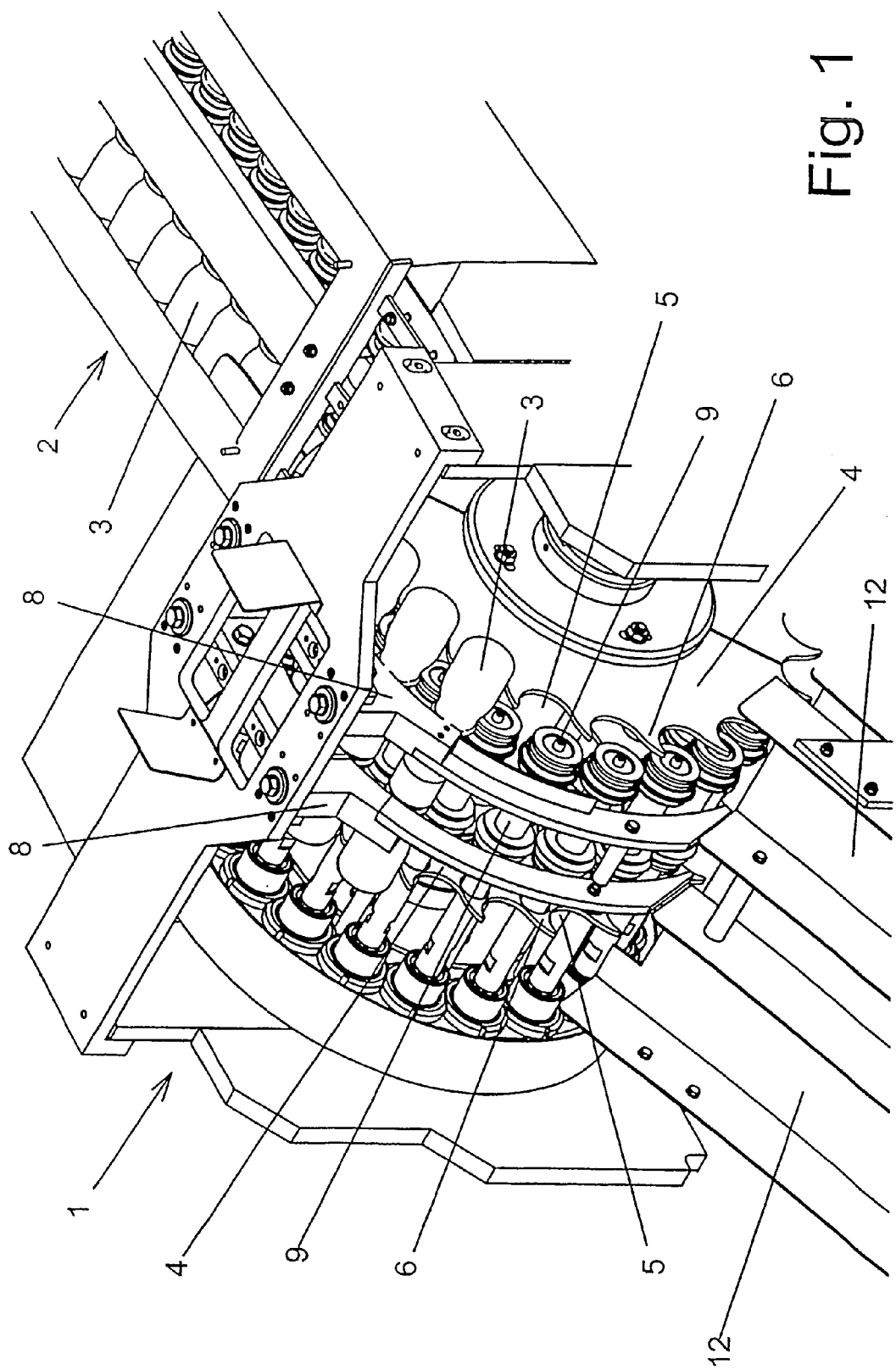
FIG. 1 is a perspective view of the machine of the invention.
Figure 2:
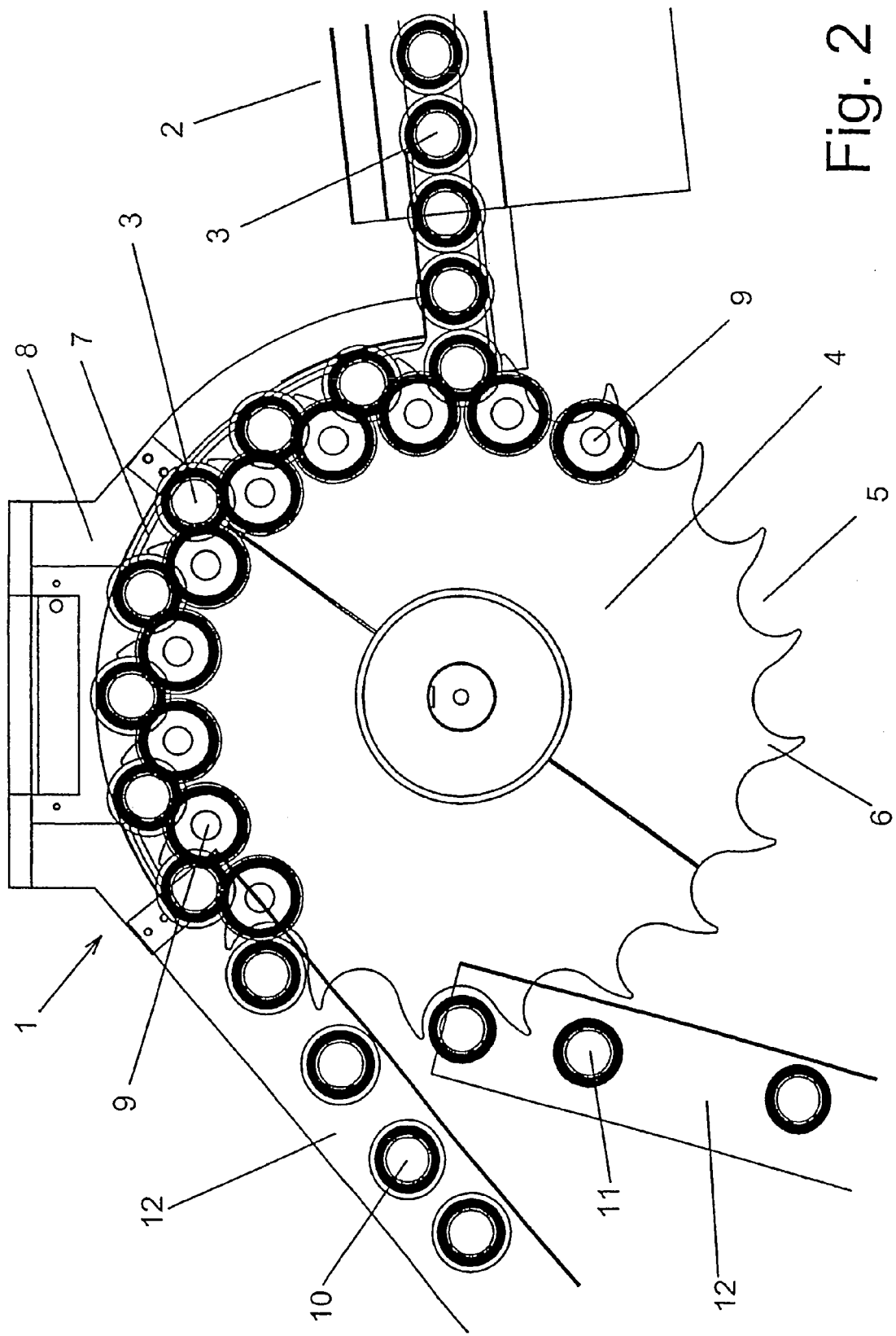
FIG. 2 is a side elevation view of the machine of the invention, showing the bottle cutting process.

As FIGS. 1 and 2 show, the cutting device 1 is fed by a pressurised air conveyor 2 which causes the bottles 3 to arrive in a row and presses them against one another.

A pair of rotating plates 4 that have a number of housings 5 around their perimeter gather up the bottles 3 from the conveyor. The spoon-shaped layout of the teeth 6 between the housings 5 prevents possible falling over of the bottles 3 during the transfer between the conveyor 2 and the plates 4.

Once the bottles 3 are in the housings 5 the rotating movement of the plates 4 begins to move them towards the blades 7 attached to their carriers 8.

At the same time, some drive pulleys 9 ensure that the bottles 3 also rotate about their own axes. Each bottle 3 is in contact with two pulleys 9, which press them against the blades 7, in such a way that the cut is made around the entire outline of the neck of the bottle 3.

Once the bottle's 3 neck has been cut, the two new bottles 10 resulting from the process, and the intermediate dome 11 left over drop off the plate 4 thanks to the shape of the teeth 6 and the bottles are then separated by means of ramps, two for the new bottles 10 and one for the intermediate domes 11.

With this system the passage between the plate housings is brought closer to the diameter of the bottles, thereby achieving housing of the largest possible number of bottles.

There follows a description of the process each bottle follows for its cutting, as well as a more detailed description of the means that take part in the process.

Figure 3:
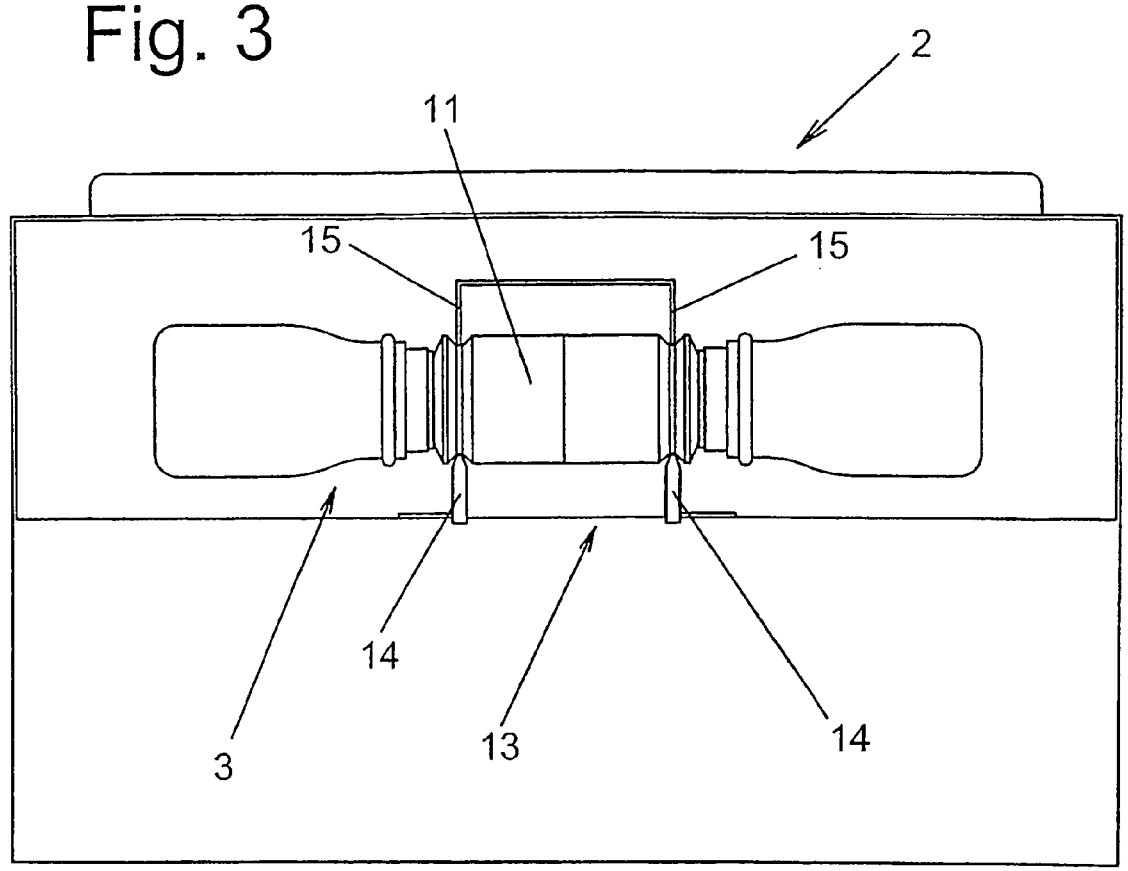
FIG. 3 is a detail of the interior of the pressurised air conveyor and the arrangement of the bottles therein.
Figure 4:
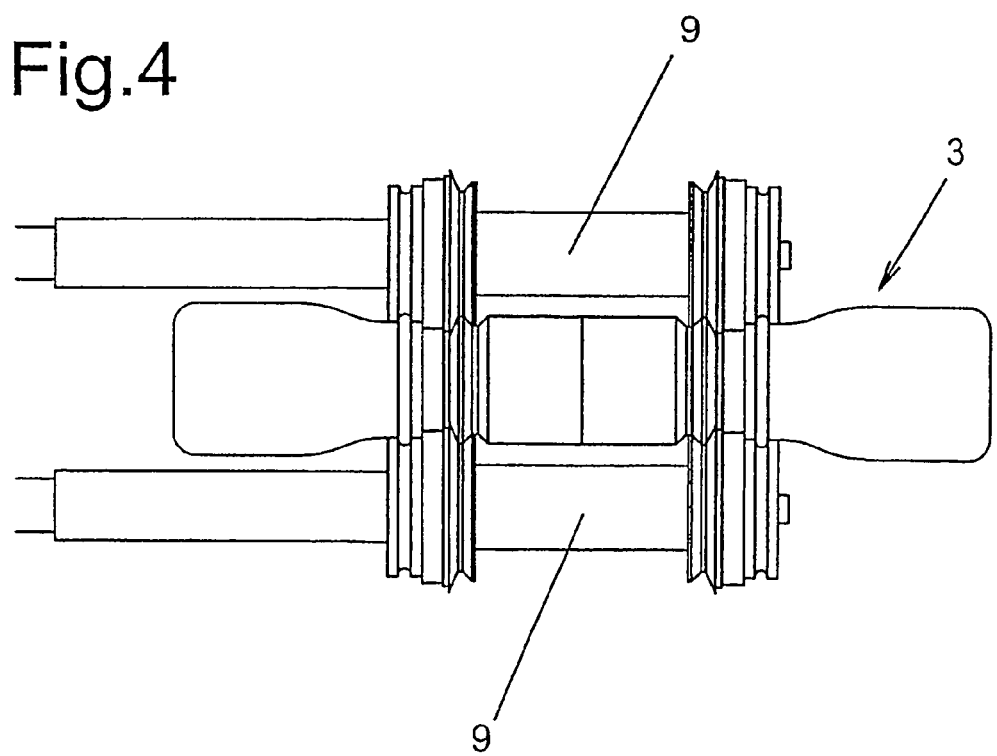
FIG. 4 is a detail view of the guiding of the bottles by the pulleys.

As noted above, the bottles 3 are fed by means of a pressurised air conveyor 2, in a row and in contact with each other. FIG. 3 shows a section of the conveyor 2 and the arrangement of the bottle 3 inside it.

The bottle 3 travels along a guide 13 provided with two lower tracks 14 and another two upper tracks 15 which are in contact with the bottom of the grooves on the neck of the bottle 3. The intermediate dome 11 is placed inside the guide 13.

By means of pressurised air that circulates inside the conveyor 2 the bottle is pushed towards the cutting station. This guiding ensures that the bottle 3 cannot fall from the conveyor 2 and ensures precise positioning when it reaches the cutting device 1.

When the bottle reaches the cutting device 1, the bottles passes to a housing 5 made for the purpose in the rotating plates 4 which move its towards the blades 7.

The bottle 3 is also in contact with two drive pulleys 9 whose profile complements that of the bottle 3 and also imparts a rotation movement to the latter.

Figure 5:
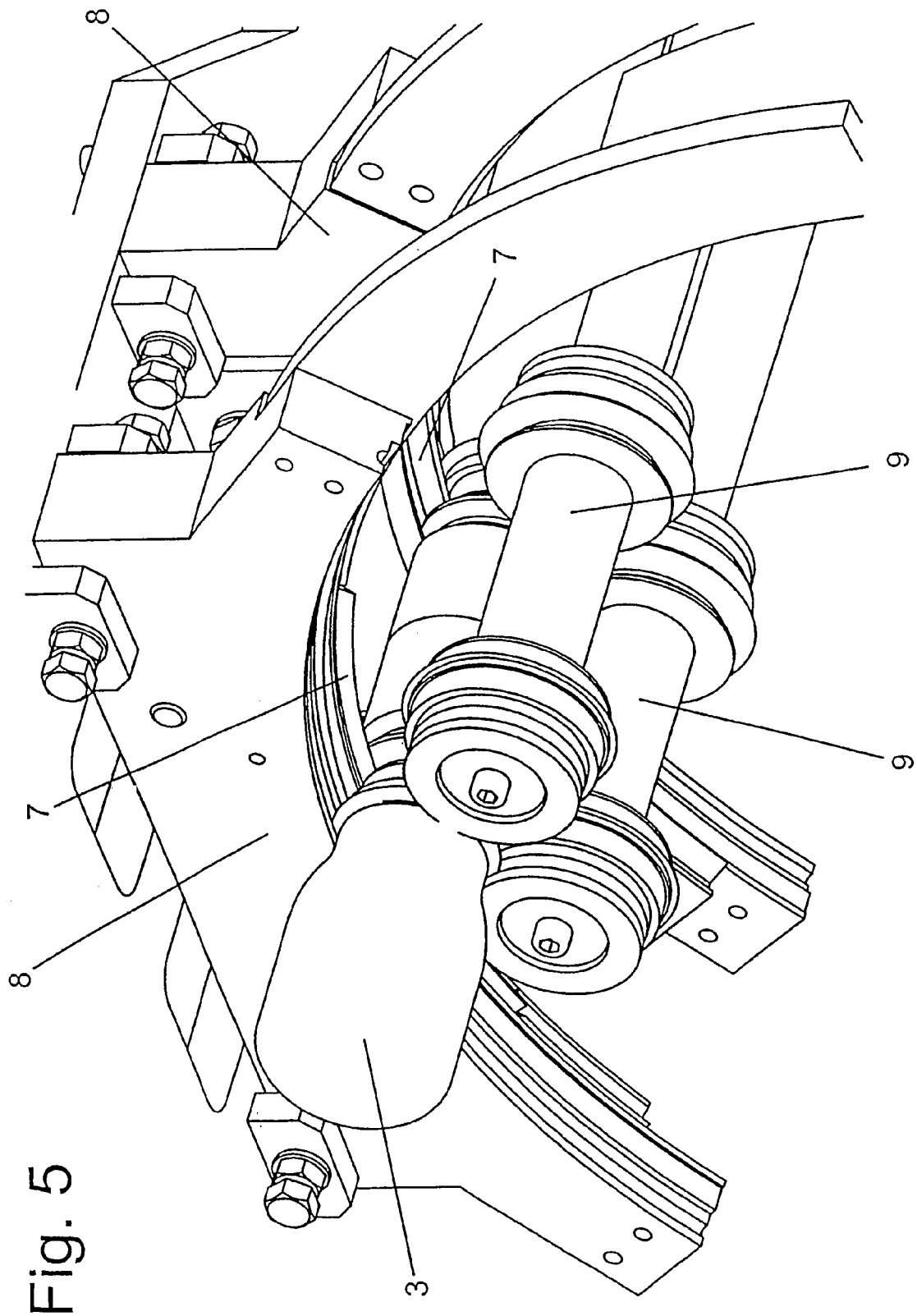
FIG. 5 is a general view of the pulleys, the blades and their carriers and the bottle at the time the cut is made.

FIG. 5 shows the fit between the two pulleys 9 and the bottle 3.

As FIG. 5 shows, the cutting of the bottle 3 neck is made by the combined action of the plates (not shown), the pulleys 9 and the blades 7. The bottle 3 travels the length of the blades and is at the same time pressed against them by the two pulleys 9. Thanks to the rotating movement imparted by the pulleys 9, the cut is made more quickly.

The blade 7 carriers 8 also have a profile that complements that of the bottle 3, so that bottle 3 guiding is perfect, without any kind of oscillation or deviation. Each bottle 3 is thus secured by three elements and six points of contact, so that cutting is secure and can be carried out at high speed.

Once the bottle 3 has been cut, it continues to be guided by the pulleys 9 and the blade 7 carriers 8 as far as the end of the guides of the blade 7 carriers 8.

As they are no longer supported, the two bottles 10 resulting from the cut fall onto two ramps 12, while the intermediate dome 11 left over falls onto another ramp 12.

Independent of the object of this invention are the materials used for manufacturing the parts of the horizontal cutter of double-bodied bottles attached to each other at the neck as described herein, as are the shapes and dimensions thereof and all accessory details that might be presented, which can be replaced by others that are technically equivalent, as long as they do not affect its essential nature nor depart from the sphere defined by the claims attached below.

The invention claimed is:

1. Machine for the cutting of double-bodied bottles (3) attached to each other at the neck, which comprises means (2) for advancing the bottles (3) and a bottle-neck cutting device (1), wherein said cutting device (1) comprises means for rotating around their axis of symmetry a pair of parallel oriented rotary plates (4), said axis of symmetry of the rotary plates (4) being horizontal, a pair of arc shaped blades (7), which are oriented in parallel to the plane of said rotary plates (4) and distanced in such a way that the double-bodied bottles (3) can fit between the arc shaped blades (7) and the rotary plates (4), a plurality of drive pulleys (9), which are arranged parallel to the axis of the rotating plates, and which in operation contact the neck of the bottles (3), whereby said rotary plates (4) comprise a plurality of housings (5) at the perimeter which are arranged in such a way that they can move the bottles (3), following a circular route, towards the arc shaped blades (7) so that a cut is made around the entire outline of the neck of the bottles (3), and whereby said pair of pulleys (9) are arranged in such a way to ensure that the bottles (3) rotate about their own axes, an that the bottles are pressed against the arc shaped blades (7).

2. Machine, according to claim 1, wherein the profile of the drive pulleys (9) and of a plurality of blade carriers (8) is defined by being complementary to that of the necks of the bottles (3).

3. Machine, according to claim 1, that comprises a pressurized air conveyor (2) for moving the bottles (3) towards the housings (5) of the plates (4) by means of pressurized air that circulates inside the conveyor, wherein this conveyor (2) comprises a guide (13) provided with a first pair of rails (14) situated in the lower part of the guide an a second pair of rails (15) situated in the upper part of the guide, so that grooves present in the neck of the bottles (3) are positioned between said lower (14) and upper rails (15).

4. Machine, according to claim 3, wherein the housings (5) are separated by spoon-shaped teeth (6) in order to facilitate positioning of the bottles (3) inside said housings (5).

5. Machine, according to claim 1, wherein three ramps (12) are disposed at an outlet section of the cutting device (1), two of which gather the two cut bottles (10) while the third gathers the intermediate dome (11) resulting from the cut.

* * * * *

UNITED STATES PATENT AND TRADEMARK OFFICE
CERTIFICATE OF CORRECTION

PATENT NO. : 7,124,673 B2 Page 1 of 1
APPLICATION NO. : 10/533803
DATED : October 24, 2006
INVENTOR(S) : Vidal Caupena et al.

It is certified that error appears in the above-identified patent and that said Letters Patent is hereby corrected as shown below:

Title page, Item [30] Foreign Application Priority Data, Delete Nov. 15, 2000 and insert Nov. 15, 2002.

Signed and Sealed this

Thirteenth Day of March, 2007

JON W. DUDAS
*Director of the United States Patent and Trademark Office*